United States Patent
Meshram et al.

(10) Patent No.: US 12,405,944 B2
(45) Date of Patent: Sep. 2, 2025

(54) SYSTEMS AND METHODS FOR SELF-SERVICE DATA STRUCTURE DISCOVERY

(71) Applicant: JPMORGAN CHASE BANK, N.A., New York, NY (US)

(72) Inventors: Amit Kumar Meshram, Romansville, PA (US); Rowen Holt, Hoboken, NJ (US); Vahe Antonian, North Caldwell, NJ (US); Ramesh Kandalam, Monroe Township, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/431,201

(22) Filed: Feb. 2, 2024

(65) Prior Publication Data

US 2024/0303234 A1    Sep. 12, 2024

Related U.S. Application Data

(60) Provisional application No. 63/489,324, filed on Mar. 9, 2023.

(51) Int. Cl.
| G06F 16/00 | (2019.01) |
| G06F 16/21 | (2019.01) |
| G06F 16/242 | (2019.01) |
| G06F 16/248 | (2019.01) |
| G06F 16/901 | (2019.01) |

(52) U.S. Cl.
CPC ........ *G06F 16/2423* (2019.01); *G06F 16/211* (2019.01); *G06F 16/2428* (2019.01); *G06F 16/248* (2019.01); *G06F 16/901* (2019.01)

(58) Field of Classification Search
CPC .. G06F 16/2423; G06F 16/211; G06F 16/248; G06F 16/287
USPC ......................................................... 707/722
See application file for complete search history.

(56) References Cited

U.S. PATENT DOCUMENTS

| 2018/0357333 | A1* | 12/2018 | Isherwood | ............ G06F 16/901 |
| 2020/0242633 | A1 | 7/2020 | Pogrebezky et al. | |
| 2022/0107944 | A1* | 4/2022 | Nhan | .................... G06F 16/287 |
| 2022/0292423 | A1* | 9/2022 | Ash | ..................... G06F 16/2428 |

OTHER PUBLICATIONS

International Search Report and Written Opinion of the International Searching Authority, dated Jun. 4, 2024, from corresponding International Application No. PCT/US2024/018532.

* cited by examiner

*Primary Examiner* — Chelcie L Daye
(74) *Attorney, Agent, or Firm* — GREENBERG TRAURIG LLP

(57) ABSTRACT

Systems and methods for self-service data structure discovery are disclosed. In one embodiment, a method may include: (1) retrieving, by a data crawler, data from one or more data sources; (2) storing, by the data crawler, the data to a data catalog; (3) receiving, at a search dashboard, a query from a user, the query comprising a search field; (4) submitting, by the search dashboard and using a query tool, the query to a data catalog, wherein the query tool searches the search field by data structure, datatype, field journey, primary key details, and/or multi-value column detail across layers, data lineage controls in the data catalog; (5) receiving, at the search dashboard, a result of the query from the data catalog; and (6) presenting, by the search dashboard, the results.

14 Claims, 3 Drawing Sheets

SYSTEMS AND METHODS FOR SELF-SERVICE DATA STRUCTURE DISCOVERY

RELATED APPLICATIONS

This application claims priority to, and the benefit of, U.S. Provisional Patent Application Ser. No. 63/489,324, filed Mar. 9, 2023, the disclosure of which is hereby incorporated, by reference, in its entirety.

BACKGROUND OF THE INVENTION

1. Field of the Invention

Embodiments are generally directed to systems and methods for self-service data structure discovery.

2. Description of the Related Art

Consumers seeking to understand the data structure of a database, data event contracts from publishers, or similar must request a time consuming, manual effort to look at code in code repositories, Avro schema, and/or batch file contracts. This is a slow process, at best.

SUMMARY OF THE INVENTION

Systems and methods for self-service data structure discovery are disclosed. In one embodiment, a method may include: (1) retrieving, by a data crawler, data from one or more data sources; (2) storing, by the data crawler, the data to a data catalog; (3) receiving, at a search dashboard, a query from a user, the query comprising a search field; (4) submitting, by the search dashboard and using a query tool, the query to a data catalog, wherein the query tool searches the search field by data structure, datatype, field journey, primary key details, and/or multi-value column detail across layers, data lineage controls in the data catalog; (5) receiving, at the search dashboard, a result of the query from the data catalog; and (6) presenting, by the search dashboard, the results.

In one embodiment, the data crawler retrieves the data periodically.

In one embodiment, the data sources may include one or more of a schema registry, a code repository, and an API store.

In one embodiment, the data may include at least one of event schema, database schema details, database tables, metadata, and API specifications.

In one embodiment, the method may also include identifying, by the data crawler or the query tool, data naming conventions based on relationships among the event schema, the database schema details, and the API specifications.

In one embodiment, the method may also include identifying, by the data crawler or the query tool, data type inconsistencies based on relationships among the event schema, the database schema details, and the API specifications.

In one embodiment, the query may include at least an application identifier, an event identifier, an API identifier, and a data identifier.

According to another embodiment, a system may include: a plurality of data sources; a data crawler computer program executed by a computer processor that may be configured to retrieve data from one or more of the plurality of data sources and to store the data to a data catalog; and an electronic device executing a search dashboard computer program and a query tool computer program, wherein the search dashboard computer program may be configured to receive a query from a user, the query comprising a search field, to submit, using the query tool computer program, the query to the data catalog, wherein the query tool computer program may be configured to search the search field by data structure, datatype, field journey, primary key details, and/or multi-value column detail across layers, data lineage controls in the data catalog, to receive a result of the query from the data catalog, and to present the result.

In one embodiment, the data crawler computer program may be further configured to retrieve the data periodically.

In one embodiment, the data sources may include one or more of a schema registry, a code repository, and an API store.

In one embodiment, the data may include at least one of event schema, database schema details, database tables, metadata, and API specifications.

In one embodiment, the data crawler computer program or the query tool computer program may be further configured to identify data naming conventions based on relationships among the event schema, the database schema details, and the API specifications.

In one embodiment, the data crawler computer program or the query tool computer program may be further configured to identify data type inconsistencies based on relationships among the event schema, the database schema details, and the API specifications.

In one embodiment, the query may include at least an application identifier, an event identifier, an API identifier, and a data identifier.

According to another embodiment, a non-transitory computer readable storage medium, may include instructions stored thereon, which when read and executed by one or more computer processors, cause the one or more computer processors to perform steps comprising: retrieving data from one or more data sources; storing the data to a data catalog; receiving a query from a user, the query comprising a search field, wherein the query may include at least an application identifier, an event identifier, an API identifier, and a data identifiers; submitting the query to a data catalog; searching the data catalog for the search field by data structure, datatype, field journey, primary key details, and/or multi-value column detail across layers, data lineage controls; receiving a result of the query from the data catalog; and presenting the results.

In one embodiment, the data may be retrieved periodically.

In one embodiment, the data sources may include one or more of a schema registry, a code repository, and an API store.

In one embodiment, the data may include at least one of event schema, database schema details, database tables, metadata, and API specifications.

In one embodiment, the non-transitory computer readable storage medium may also include instructions stored thereon, which when read and executed by one or more computer processors, cause the one or more computer processors to perform steps comprising identifying, by the data crawler or the query tool, data naming conventions based on relationships among the event schema, the database schema details, and the API specifications.

In one embodiment, the non-transitory computer readable storage medium may also include instructions stored thereon, which when read and executed by one or more computer processors, cause the one or more computer processors to perform steps comprising identifying data type inconsistencies based on relationships among the event schema, the database schema details, and the API specifications.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for self-service data structure discovery are disclosed.

Embodiments may implement self-service data discovery engines that may dynamically fetch schema details from a database, tables (e.g., with primary keys information), columns and fields under multi-value column for an application identifier, etc. Embodiments may provide a search capability to find any specific data elements across table, column, multi-value column, etc. Embodiments may also identify the occurrence of specific data elements across multiple tables, application identifiers, etc. Embodiments may also integrate with other sources, including event registries from data publishers, Application Programming Interface (API) registry stores for consumers of the data, etc.

Figure 1:
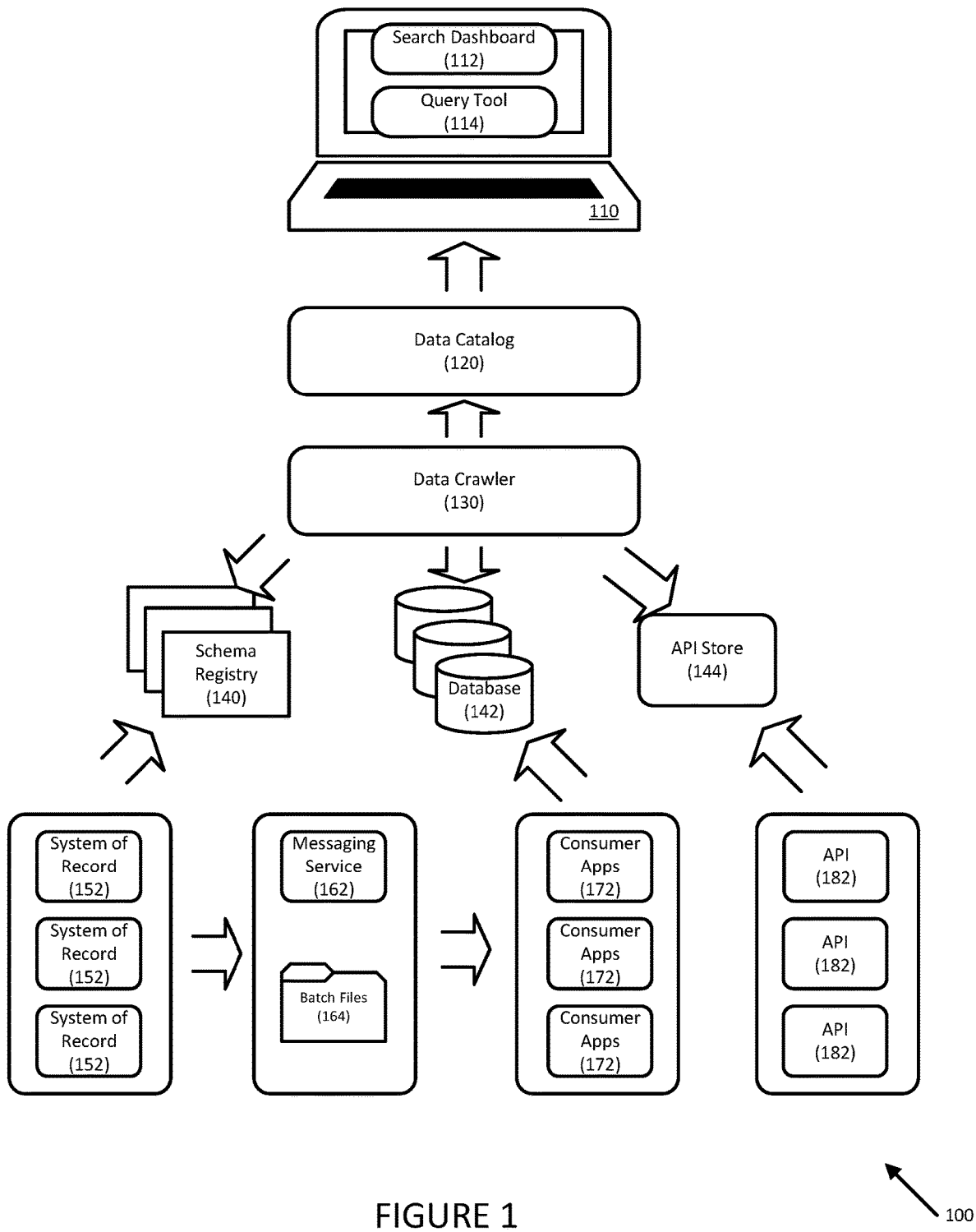
FIG. 1 depicts a self-service data structure discovery engine according to an embodiment.

Referring to FIG. 1, a self-service data structure discovery engine system is disclosed according to an embodiment. System 100 may include user electronic device 110, such as a computer (e.g., workstation, desktop, laptop, notebook, tablet, etc.), a smart device, an Internet of Things appliance, etc., that may execute search dashboard 112.

Search dashboard 112 may use or include query tool 114 to pull information from data catalog 120. Data Catalog 120 may be a database/data repository for data gathered from different sources, such as application databases 142, real time data exchange event schema and API registry stores 144, etc.

Search dashboard 112 may provide an interface by which a user may enter search criteria for one or more of an application identifier, data exchange event identifier, API identifier, multiple detailed data identifiers, etc. For example, search dashboard 112 may provide an interface that provides a capability to search a field across various layers, data lineage controls, etc. by data structure, datatype, field journey, primary key details, multi-value column details, etc., and may provide access to data for ease of data governance and audits.

Search dashboard 112 may interface with data catalog 120, which may maintain a catalog of data received from data crawler 130. Data crawler 130 may crawl one or more schema registries 140, one or more databases 142, and one or more API stores 144 for data.

For example, data crawler 130 may periodically (e.g., hourly, daily, weekly, etc.) or on demand pull the information from different sources such as one or more schema registries 140, one or more databases 142, one or more API stores 144, and store the data in data catalog 120. Each source (e.g., one or more schema registries 140, one or more databases 142, one or more API stores 144) may have a different plugin, and each plugin may provide an interface for REST API calls. For example, each database 142 may have a database related plugin to pull schema information, each schema registry 140 and each API store 144 may provide APIs to integrate and pull the information, etc.

Data Catalog 120 may organize the data it receives into a database or data platform. Examples of databases or data platforms may include AWS S3 buckets, Hive, Redshift, Oracle, etc.

One or more schema registries 140 may maintain schemas from one or more systems of record 152, which may maintain the data. One or more systems of record 152 may stream data to messaging service 162, such as Kafka. Examples of data that may be streamed include data exchange events such as customer transactions, balances, etc. Messaging service 162 may maintain batch files 164.

Data from messaging service 162 may be provided to consumer apps 172, which may be consumers of the data. The data may then flow to databases 142.

APIs 182 may provide an access point to data. API store 144 may maintain APIs 182.

Figure 2:
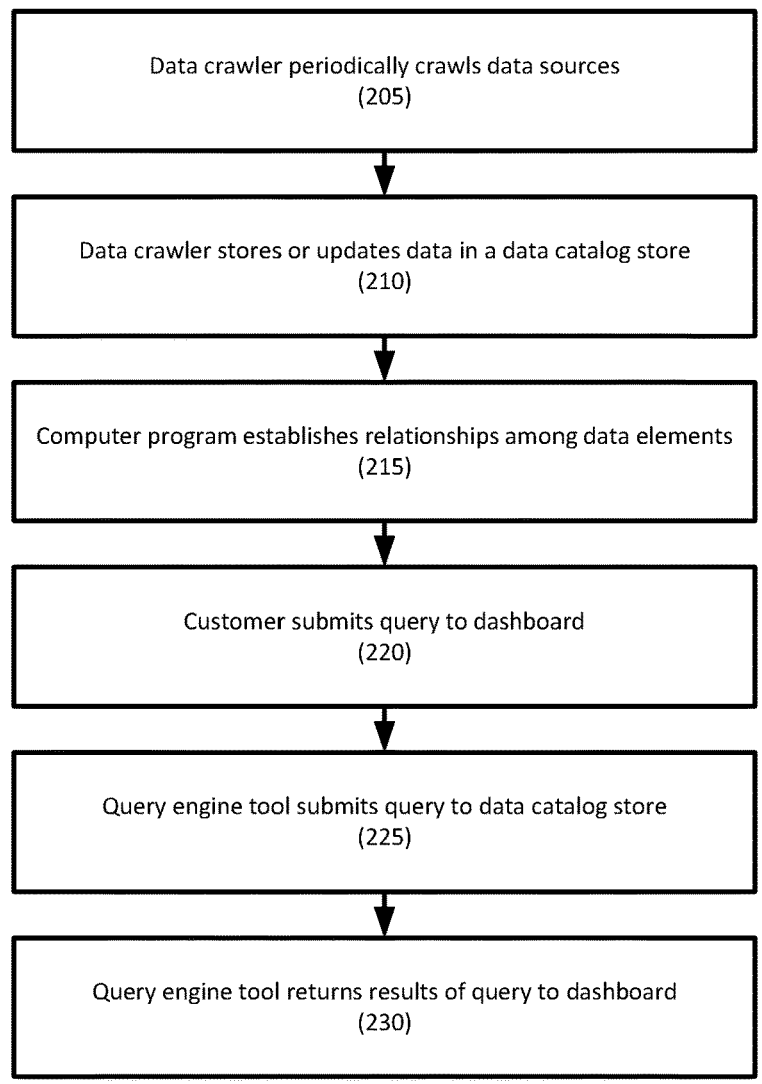
FIG. 2 depicts a method for using self-service data structure discovery engine that is disclosed according to an embodiment.

FIG. 2 depicts a method for using self-service data structure discovery engine that is disclosed according to another embodiment.

In step 205, a data crawler may periodically (e.g., hourly, daily, weekly, etc.) or as otherwise necessary and/or desired may retrieve data from one or more sources. Examples of sources may include schema registries, databases, code repositories, API stores, etc. For example, the data crawler may use HTTP/API calls to pull event schema from a schema registry, may pull database schema details from a database, may retrieve database tables and metadata from code repositories, and may use API calls to pull API specifications from an API store.

In step 210, the data crawler may store the data in a data catalog store, or may update the data in the data catalog store with updated data.

In step 215, a computer program, such as a query tool or the data crawler, may identify data naming conventions based on relationships among event schemas (e.g., Avro fields), the database schema details, and the API specifications (e.g., swagger fields). For example, datatype inconsistencies/variations, lineage patterns, duplicity, unknown/unwanted elements at different layers, etc. may also be identified. In one embodiment, machine learning and/or artificial intelligence and other design patterns may be used to establish the relationships.

In step 220, a user may submit a query using a dashboard. For example, the user may submit a query. The query may include one or more of an application identifier, event identifier, API identifier, multiple data identifiers, etc. In one embodiment, the search dashboard may provide an interface that provides a capability to search a field across various layers, data lineage controls, etc. by data structure, datatype, field journey, primary key details, multi-value column details, etc.

In step 225, a query tool may submit the query to the data in the data catalog store.

The data queries may depend on the database choice (and its native query language) for data catalog. For example, HIVEQL for Hive, SQL for Oracle, S3 Select/Redshift Spectrum for S3, etc. may be used. The query response provides the filtered data to be displayed on dashboard.

There may be a default query executed to render the dashboard landing page with overview information.

In step 230, the results of the query may be returned to the dashboard. In one embodiment, the data may be returned in a format, such as JSON, that makes it easy to render the data in the search dashboard.

In one embodiment, the results of the query may be used periodically to generate and trigger reports for data lineage, etc. For example, the results may be used as a source of information to determine if there is any deviation in the system design, duplication of data etc.

Figure 3:
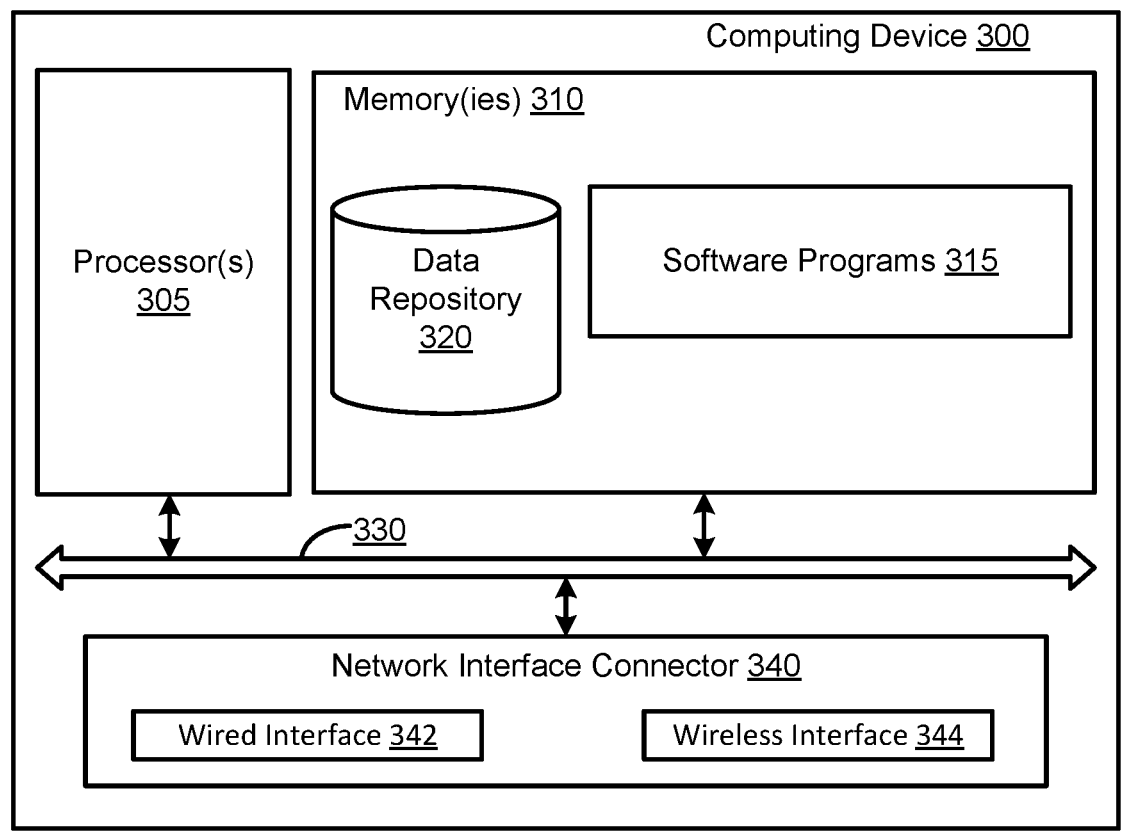
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
    automatically crawling, by a data crawler, a plurality of data sources comprising a schema registry, a database, and an API store, wherein the crawling identifies data in each of the plurality of data sources, and wherein the crawling is performed periodically;
    pulling, by the data crawler, data from the plurality of data sources using a plugin for each of the plurality of data sources that provides an interface for REST API calls;
    storing, by the data crawler, the data to a data catalog;
    receiving, at a search dashboard, a query from a user, the query comprising a search field;
    submitting, by the search dashboard and using a query tool, the query to a data catalog, wherein the query tool searches the search field by data structure, datatype, field journey, primary key details, and/or multi-value column detail across layers, data lineage controls in the data catalog;
    receiving, at the search dashboard, a result of the query from the data catalog; and
    presenting, by the search dashboard, the results.

2. The method of claim 1, wherein the data comprises at least one of event schema, database schema details, database tables, metadata, and API specifications.

3. The method of claim 2, further comprising:
identifying, by the data crawler or the query tool, data naming conventions based on relationships among the event schema, the database schema details, and the API specifications.

4. The method of claim 2, further comprising:
identifying, by the data crawler or the query tool, data type inconsistencies based on relationships among the event schema, the database schema details, and the API specifications.

5. The method of claim 1, wherein the query comprises at least an application identifier, an event identifier, an API identifier, and a data identifier.

6. A system, comprising:
a plurality of data sources comprising a schema registry, a database, and an API store;
a data crawler computer program executed by a computer processor that is configured to automatically craw the plurality of data sources, to pull data from the plurality of data sources using a plugin for each of the plurality of data sources that provides an interface for REST API calls and to store the data to a data catalog, wherein the crawling identifies data in each of the plurality of data sources, and wherein the crawling is performed periodically; and
automatically crawling, by a data crawler, a plurality of data sources comprising a schema registry, a database, and an API store;
an electronic device executing a search dashboard computer program and a query tool computer program, wherein the search dashboard computer program is configured to receive a query from a user, the query comprising a search field, to submit, using the query tool computer program, the query to the data catalog, wherein the query tool computer program is configured to search the search field by data structure, datatype, field journey, primary key details, and/or multi-value column detail across layers, data lineage controls in the data catalog, to receive a result of the query from the data catalog, and to present the result.

7. The system of claim 6, wherein the data comprises at least one of event schema, database schema details, database tables, metadata, and API specifications.

8. The system of claim 7, wherein the data crawler computer program or the query tool computer program is further configured to identify data naming conventions based on relationships among the event schema, the database schema details, and the API specifications.

9. The system of claim 7, wherein the data crawler computer program or the query tool computer program is further configured to identify data type inconsistencies based on relationships among the event schema, the database schema details, and the API specifications.

10. The system of claim 6, wherein the query comprises at least an application identifier, an event identifier, an API identifier, and a data identifier.

11. A non-transitory computer readable storage medium, including instructions stored thereon, which when read and executed by one or more computer processors, cause the one or more computer processors to perform steps comprising:
automatically crawling a plurality of data sources comprising a schema registry, a database, and an API store, wherein the crawling identifies data in each of the plurality of data sources, and wherein the crawling is performed periodically;
pulling data from the plurality of data sources using a plugin for each of the plurality of data sources that provides an interface for REST API calls;
storing the data to a data catalog;
receiving a query from a user, the query comprising a search field, wherein the query comprises at least an application identifier, an event identifier, an API identifier, and a data identifier;
submitting the query to a data catalog;
searching the data catalog for the search field by data structure, datatype, field journey, primary key details, and/or multi-value column detail across layers, data lineage controls;
receiving a result of the query from the data catalog; and
presenting the results.

12. The non-transitory computer readable storage medium of claim 11, wherein the data comprises at least one of event schema, database schema details, database tables, metadata, and API specifications.

13. The non-transitory computer readable storage medium of claim 12, further including instructions stored thereon, which when read and executed by one or more computer processors, cause the one or more computer processors to perform steps comprising identifying data naming conventions based on relationships among the event schema, the database schema details, and the API specifications.

14. The non-transitory computer readable storage medium of claim 12, further including instructions stored thereon, which when read and executed by one or more computer processors, cause the one or more computer processors to perform steps comprising identifying data type inconsistencies based on relationships among the event schema, the database schema details, and the API specifications.

* * * * *